United States Patent
Nomura

(10) Patent No.: US 9,051,886 B2
(45) Date of Patent: Jun. 9, 2015

(54) HYBRID VEHICLE

(75) Inventor: Yoshihiro Nomura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 13/509,115

(22) PCT Filed: Nov. 8, 2011

(86) PCT No.: PCT/JP2011/075720
§ 371 (c)(1),
(2), (4) Date: May 10, 2012

(87) PCT Pub. No.: WO2013/069094
PCT Pub. Date: May 16, 2013

(65) Prior Publication Data
US 2014/0236402 A1    Aug. 21, 2014

(51) Int. Cl.
*F02D 29/02* (2006.01)
*B60K 6/48* (2007.10)
(Continued)

(52) U.S. Cl.
CPC . *F02D 29/02* (2013.01); *B60K 6/48* (2013.01); *B60W 10/06* (2013.01); *B60W 20/00* (2013.01); *B60L 1/003* (2013.01); *B60L 11/14* (2013.01); *B60L 11/1816* (2013.01); *B60L 11/1868* (2013.01); *B60L 2210/10* (2013.01);
(Continued)

(58) Field of Classification Search
CPC .. B60K 6/48; B60W 20/00; B60W 30/19054; B60W 10/06; B60L 1/003; B60L 11/14; B60L 11/1816; B60L 11/1868; B60L 1/006; F02D 20/02

USPC ............. 701/22; 477/19, 99; 180/65.265, 180/65.275, 65.28, 65.285
See application file for complete search history.

(56) References Cited

U.S. PATENT DOCUMENTS 6,786,846 B2 * 9/2004 Chang .................... 477/99
7,022,943 B1 * 4/2006 Barta ..................... 219/205
(Continued)

FOREIGN PATENT DOCUMENTS

| JP | A-9-86218 | 3/1997 |
| JP | A-11-178109 | 7/1999 |

(Continued)

OTHER PUBLICATIONS

Dec. 6, 2011 International Search Report issued in International Patent Application No. PCT/JP2011/075720 (with translation).
(Continued)

*Primary Examiner* — Marthe Marc-Coleman
(74) *Attorney, Agent, or Firm* — Oliff PLC

(57) ABSTRACT

A hybrid vehicle which starts an engine safely by using a remote switch even when a charging plug is connected is provided. The hybrid vehicle can be charged from an external power source. The controller of the hybrid vehicle executes the following process, when an engine start request is received while the charging plug for supplying electric power from the external power source is connected to the vehicle. (1) Starting an engine if charging is not performed and a shift lever is at a parking position when a request for starting the engine (remote start request) is received from a remote switch outside the vehicle, and rejecting a remote start request if the shift lever is at a position other than a parking position. (2) Rejecting a request for starting the engine from a switch provided in the vehicle.

6 Claims, 4 Drawing Sheets

(51) Int. Cl.
*B60W 10/06* (2006.01)
*B60W 20/00* (2006.01)
*B60L 1/00* (2006.01)
*B60L 11/14* (2006.01)
*B60L 11/18* (2006.01)
*B60W 30/18* (2012.01)

(52) U.S. Cl.
CPC .......... *B60L2210/30* (2013.01); *B60L 2210/40* (2013.01); *B60L 2240/423* (2013.01); *B60L 2240/441* (2013.01); *B60L 2240/80* (2013.01); *B60L 2250/16* (2013.01); *B60L 2250/24* (2013.01); *Y02T 10/7077* (2013.01); *Y02T 10/7005* (2013.01); *Y02T 10/7241* (2013.01); *Y02T 10/7066* (2013.01); *Y02T 10/7216* (2013.01); *Y02T 10/642* (2013.01); *Y02T 90/14* (2013.01); *Y02T 90/127* (2013.01); B60W 30/18054 (2013.01); *B60W 2520/04* (2013.01); *B60W 2540/16* (2013.01); *B60W 2510/188* (2013.01); *Y10S 903/903* (2013.01); B60L 1/006 (2013.01); *B60L 2240/421* (2013.01); *B60L 2240/443* (2013.01); *B60L 2240/549* (2013.01); *B60L 2240/70* (2013.01); *Y02T 10/6221* (2013.01); *Y02T 90/16* (2013.01); *Y02T 10/7291* (2013.01); *Y02T 10/70* (2013.01)

(56) References Cited

U.S. PATENT DOCUMENTS

| 7,832,512 B2 * | 11/2010 | Watanabe et al. .......... 180/65.28 |
| 2005/0234604 A1 | 10/2005 | Nakamura et al. |
| 2007/0103833 A1 | 5/2007 | Harris, IV |
| 2010/0120581 A1 | 5/2010 | Mitsutani et al. |
| 2010/0231037 A1 * | 9/2010 | Esaka et al. .................... 307/9.1 |

FOREIGN PATENT DOCUMENTS

| JP | A-2003-42045 | 2/2003 |
| JP | A-2005-329931 | 12/2005 |
| JP | A-2006-20455 | 1/2006 |
| JP | A-2007-174889 | 7/2007 |
| JP | A-2007-236023 | 9/2007 |
| JP | A-2009-118658 | 5/2009 |
| JP | A-2009-522654 | 6/2009 |
| JP | A-2010-104141 | 5/2010 |
| JP | A-2010-119168 | 5/2010 |
| JP | A-2010-242549 | 10/2010 |
| JP | A-2010-276003 | 12/2010 |
| WO | WO 2007/081519 A2 | 7/2007 |

OTHER PUBLICATIONS

Dec. 6, 2011 Written Opinion issued in International Patent Application No. PCT/JP2011/075720 (with translation).

* cited by examiner

HYBRID VEHICLE

CROSS-REFERENCE TO RELATED APPLICATION

This application claims priority to PCT International Patent Application No. PCT/JP2011/075720 filed on Nov. 8, 2011, the contents of which are hereby incorporated by reference into the present application.

TECHNICAL FIELD

The present invention relates to a hybrid vehicle comprising both a motor and an engine for driving wheels, in which a vehicle battery is charged by using a power source that is external to the vehicle. A hybrid vehicle of this kind is known by the common name of "plug-in hybrid vehicle".

DESCRIPTION OF RELATED ART

In electric vehicles including plug-in hybrid vehicles, during battery charging, a plug (charging plug) which supplies external electric power is connected to the vehicle, and hence a program for prohibiting movement of the vehicle is implemented into the controller of the vehicle. For example, Patent Document 1 discloses an electric vehicle which prohibits starting of the system when a vehicle power switch has been switched on while the charging plug is connected. The electric vehicle disclosed in Patent Document 1 does not permit charging of a battery and also displays that charging of the battery has not been permitted if the charging plug has been connected while the vehicle system is being activated in travel mode. Moreover, Patent Document 2 discloses an electrical vehicle which controls a motor so as to lock the wheel axles, if a shift lever is changed from a parking position to another position while the charging plug is connected.
Patent Document 1: Japanese Patent Application Publication No. 2010-119168
Patent Document 2: Japanese Patent Application Publication No. 2009-118658

BRIEF SUMMARY OF INVENTION

As disclosed in Patent Document 1, it is desirable from a safety viewpoint that the vehicle system is not activated while the charging plug is connected. On the other hand, on cold winter mornings, for instance, it is preferable to perform a warm-up operation of the engine before getting into the vehicle. Therefore, a remote switch for starting the engine may be provided. However, a hybrid vehicle which employs the technique in Patent Document 1 is programmed so as not to start up the system when the charging plug is connected, and therefore the remote switch cannot be used. Charging is often carried out during the night, and in the morning, although charging has been completed, it is common for the charging plug to remain connected. However, in the conventional art, it is not possible to start an engine remotely if the charging plug is connected, and this is inconvenient. The present specification provides technique for resolving inconveniences of this kind.

The hybrid vehicle disclosed by the present specification can be charged from an external power source. The controller of the hybrid vehicle performs the following process, while the hybrid vehicle is connected with a plug (charging plug) that supplies electric power thereto from the external power source is connected to the vehicle.

(1) Starting an engine if charging is not performed and a shift lever is at a "parking" position when a signal indicating a request for starting the engine is received from a remote switch outside the vehicle, and rejecting the remote start request if the shift lever is at a position other than the "parking" position. This "signal indicating a request for starting the engine sent by a remote switch outside the vehicle" may be referred to as a "remote start request" below.

(2) Rejecting a signal indicating a request for starting the engine from a switch provided in the vehicle. This "signal indicating a request for starting the engine sent from a switch provided in the vehicle" may be referred to as an "in-vehicle start request".

The novel hybrid vehicle disclosed by the present specification rejects the in-vehicle start request if the charging plug is connected, and only permits the remote start request on condition that the shift lever is positioned at the parking position. Here, the "switch provided in the vehicle" is a switch provided at a driver's seat, and typically is a switch which starts the vehicle system, which is known as an ignition switch, a power switch, or a main switch. The hybrid vehicle disclosed in the present specification rejects the engine start request from the switch provided at the driver's seat, while the charging plug is connected. On the other hand, the remote start request is accepted on condition that the shift lever is at the parking position. It is possible to start the engine by a remote operation, while ensuring the safety of the vehicle. By employing the technique disclosed by the present specification, for example, charging is set up with a timer in the evening, and when the charging is completed the next morning, the engine can be started by the remote switch from inside the user's house, even while the charging plug is still connected. The condition for starting the engine with the remote switch is that the position of the shift lever is at "parking", and therefore the vehicle does not move accidently when the engine is started. On the other hand, the engine start by an operation of the switch in the vehicle is rejected, and therefore the vehicle is prevented from starting running while the charging plug is connected.

Preferably, the controller of the hybrid vehicle disclosed by the present specification may prohibit movement of the shift lever from the "parking" position, when the remote start request is received. In the case of the remote start request, the hybrid vehicle may start the engine with the condition that the shift lever is at the "parking" position. However, for instance, even if the user mistakenly attempts to operate the shift lever while the charging plug is connected, then the user cannot move the shift lever. By prohibiting the movement of the shift lever to other positions, it is possible reliably to prohibit the vehicle from running after starting the engine. Here, it should be noted that "prohibiting movement of the shift lever from the parking position" does not mean that the devices provided in the vehicle directly moves the shift lever to the "parking" position. "Prohibiting movement of the shift lever from the parking position" means locking the shift lever in position, provided that the shift lever is at the "parking" position, and does not impede an operation of the shift lever by the user when the shift lever is at a position other than "parking".

Moreover, preferably, the controller may release prohibition of the movement of the shift lever, if disconnection of the charging plug is detected after the engine has been started by the remote start request. If the charging plug is disconnected, then movement of the shift lever may be permitted and vehicle assumes a movable state.

More preferably, the controller of the hybrid vehicle disclosed by the present specification may also execute the following process. The controller of the hybrid vehicle may stop charging and start the engine if the shift lever is at the "parking" position, when the remote start request is received during the charging by the external power source. On the other hand, if the shift lever is in a position other than "parking", then the controller may reject the remote start request. Moreover, if an engine stop request is received from the remote switch or a predetermined time limit has expired, then the engine may be stopped and charging may be restarted.

By adding the process described above, even if the charging is in progress, it is possible to interrupt this charging and the engine can be started from outside the vehicle.

The details and further improvements of the technique disclosed by the present specification are described in embodiments of the invention.

DETAILED DESCRIPTION OF INVENTION

Figure 1:
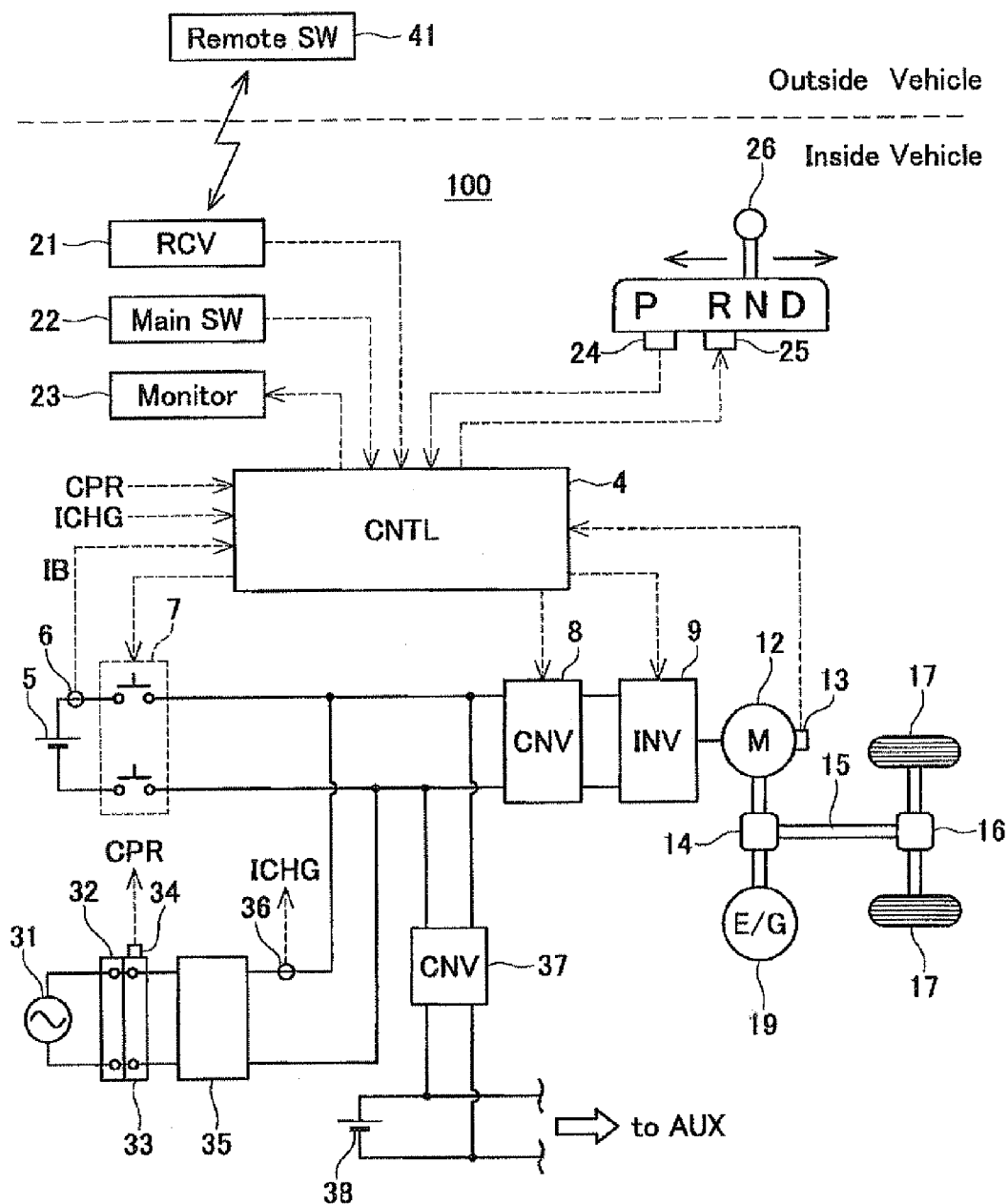
FIG. 1 is a schematic block diagram of a hybrid vehicle.

FIG. 1 shows a schematic block diagram of a hybrid vehicle 100 according to an embodiment. It should be noted that FIG. 1 does not depict all of the units which are essentially provided in the hybrid vehicle 100. FIG. 1 shows a unit which relates to the technical description of the embodiment.

Firstly, the drive mechanism system of the hybrid vehicle 100 will be described. The hybrid vehicle 100 selectively uses a motor 12 and an engine 19, as appropriate. An output shaft of the motor 12 and an output shaft of the engine 19 are combined in a power distribution mechanism 14, and the torque thereof is transmitted to an axle 15. The axle 15 is coupled to drive wheels 17 via a differential mechanism 16. If a large drive force is required, then the motor 12 is driven in addition to the engine 19. The output torques from the motor and engine are combined in the power distribution mechanism 14 and transmitted to the drive wheels 17 via the axle 15. If such a large torque is not required, for example, when travelling at a constant speed, then the engine 19 is stopped and the drive wheels 17 are driven by the motor 12 alone. On the other hand, if remaining electricity (State of Charge: SOC) of a main battery 5 has become low, then the engine 19 is started, and torque of the engine 19 is distributed between the axle 15 and the motor 12 via the power distribution mechanism 14. The motor 12 is driven to generate electricity while the drive wheels 17 are driven by the output torque from the engine 19. Furthermore, when the driver steps the brake pedal, the axle 15 couples directly with the motor 12, and the motor 12 is driven in reverse from the output shaft side by kinetic energy of the vehicle, and generates electricity. The main battery 5 and a sub battery 38 can be charged by the power thus obtained (regenerated power). Furthermore, the hybrid vehicle 100 is also able to charge the main battery 5 and the sub battery 38 by receiving a supply of power from an external power source 31.

Furthermore, the motor 12 also functions as a cell motor. In other words, the hybrid vehicle 100 is able to use the motor 12 to start the engine 19. The power distribution mechanism 14 is a planetary gear, in which a sun gear is coupled to the motor 12, a planetary carrier is coupled to the engine 19, and a ring gear is coupled to the axle 15. If the ring gear is fixed and the motor 12 is driven, then the engine 19 is turned from the output shaft side. If fuel is supplied simultaneously, then the engine 19 starts.

The motor 12 and the engine 19 are controlled by a controller 4. In practice, the hybrid vehicle 100 comprises a plurality of controllers which is prepared for respective functions, and this plurality of controllers collaborates so as to function as one vehicle system. However, in the present specification, in order to simplify the description, even if the control system is divided into a plurality of controllers physically, they are referred to generally as "controller 4".

The power system of the hybrid vehicle 100 will now be described. The hybrid vehicle 100 comprises two batteries (the main battery 5 and the sub battery 38). The main battery 5 is a high-output high-capacity battery which stores electrical power for driving the motor 12. The main battery 5 has, for example, a maximum output voltage of 300 (V) and a maximum output current of 200 (A); in other words, a maximum output power of 60 (kW). The main battery 5 is a lithium ion type of battery, for example. The maximum output power required in the main battery 5 is determined by a maximum output of the motor 12. In the case of the present embodiment, the maximum output of the motor 12 is 60 (kW), and in accordance with this, the main battery 5 having the maximum output power of 60 (kW) is employed.

An output from the sub battery 38 is small compared to the main battery 5, and is set to 12 (V), for instance. The sub battery 38 supplies power to devices (low-power devices) which are driven at a low voltage (a low voltage compared to the output of the main battery 5). The low-power devices are, for example, cabin lights, a vehicle audio system, a navigation device, and so on. Furthermore, various controller circuits mounted in the vehicle are also included in the "low-power devices". The controller 4 is also one of the low-power devices. In the following description, a group of low-power devices driven by output power of the sub battery 38 is referred to generally as "auxiliary devices". The text "AUX" in FIG. 1 refers to this auxiliary device group.

The main battery 5 is connected to the first converter 8 via the system main relay 7. The system main relay 7 is a switch which connects or shuts off the main battery 5 to/from the electric circuit of the drive system, and is controlled by the controller 4. A current sensor (first current sensor 6) which measures an input current and an output current of the main battery 5 is connected between the main battery 5 and the system main relay 7. The first converter 8 is a DC/DC converter, which raises the DC output voltage of the main battery 5 (300 (V)) to a voltage suited to driving the motor (for example, 600 (V)). The DC power which has been raised by the first converter 8 is input to an inverter 9. The inverter 9 converts the DC power to AC power for driving the motor 12, and outputs this AC power to the motor 12.

The first converter 8 functions as a step-down converter which reduces a voltage on the inverter 9 side and outputs the reduced voltage to the main battery 5 side. Regenerated power (AC current) generated by the motor 12 is converted to a DC current by the inverter 9, and the voltage is reduced by the first converter 8 and then supplied to the main battery 5. The first converter 8 is a so-called buck-boost converter.

The main battery 5 is also connected to a second converter 37 via the system main relay 7. The second converter 37 is also a DC/DC converter, similar to the first converter 8. The second converter 37 reduces the output voltage of the main battery 5 to the output voltage of the sub battery 38. The output of the second converter 37 is supplied to the auxiliary device group described above and is also supplied to the sub battery 38. When the system main relay 7 is closed and the second converter 37 is operating, then the power of the main battery 5 is supplied to the auxiliary devices. Alternatively, regenerated power is supplied to the auxiliary devices while regenerated power is obtained. In other words, the sub battery 38 supplies power to the auxiliary devices when the main battery 5 or regenerated power is not available.

The first converter 8, the second converter 37 and the inverter 9 each comprise a switching circuit for power conversion. The switching circuit is a combination of a so-called power transistor, such as an IGBT, and a diode (free-wheeling diode). The controller 4 sends an command to these switching circuits. The command is a PWM (Pulse Width Modulation) signal, and the output voltage (in the case of a converter) or the output current frequency (in the case of an inverter) is adjusted on the basis of the duty ratio of this PWM signal. Furthermore, when recovering regenerated power also, the controller 4 controls the inverter 9 in such a manner that the regenerated power (AC) is converted to DC power. The internal structure of the converter and the inverter is commonly known and detailed description thereof is omitted here.

Furthermore, the hybrid vehicle 100 is also able to charge the main battery 5 and the sub battery 38 by receiving the supply of power from the external power source 31. Consequently, the hybrid vehicle 100 is a so-called plug-in hybrid vehicle. The hybrid vehicle 100 comprises a battery charger 35 and a socket 33. The socket 33 is one type of connector for connecting a plug (a charging plug 32) which supplies power from the external power source 31. The battery charger 35 is an AC/DC converter which converts AC power supplied by the external power source 31 to DC power. The output from the battery charger 35 is connected in parallel to an output terminal of the main battery 5 via the system main relay 7. The output of the battery charger 35 is supplied to the main battery 5, and is also supplied to the sub battery 38 via the second converter 37. A current sensor (second current sensor 36) for measuring the output current is provided on the output side of the battery charger 35, and a measurement value ICHG (an output current of the battery charger 35) is supplied to the controller 4. Furthermore, a sensor (plug detection sensor 34) which detects whether or not the charging plug 32 is connected is provided to the socket 33, and the data from this sensor (plug detection signal CPR) is supplied to the controller 4.

The operating system of the hybrid vehicle 100 will now be described. FIG. 1 depicts a main switch 22 and a shift lever 26 (gear selection lever) as devices which are operated by the driver. The main switch 22 is a switch which is usually called an ignition switch, a power switch, or the like. The controller 4 is programmed so as to set the vehicle to a drivable state, when a signal indicating that the main switch 22 has been switched on is received.

As commonly known, the shift lever 26 is a switch which changes the vehicle drive system to any one of P: "parking", R: "reverse", N: "neutral" and D: "drive". When the shift lever 26 is at the "parking" position, the user is able to remove the ignition key. Furthermore, when the shift lever 26 is at the "parking" position, the controller 4 permits an engine start request (described below). In other words, in the hybrid vehicle 100, when the shift lever 26 is in a position other than "parking", it becomes impossible to start the engine 19. The process of this kind (restrictive condition) is determined by a program in the controller 4. The shift lever 26 is provided with a sensor (shift position sensor 24) which detects the position of the shift lever 26, and a signal from this sensor is sent to the controller 4. The controller 4 judges whether engine start is permitted or prohibited based on a signal from the shift position sensor 24.

Furthermore, when the shift lever 26 is at the "parking" position, and the ignition key is removed, then movement of the shift lever 26 is prohibited. More specifically, a solenoid 25 (actuator) is provided in the shift lever 26, and in accordance with an command from the controller 4, a rod of the solenoid 25 is pushed out and fits into a groove in the shift lever 26, whereby the shift lever 26 becomes immovable. Generally speaking, the solenoid 25 is a lock mechanism which restricts movement of the shift lever 26. If the locking operation is performed when the shift lever 26 is in a position other than the parking position, the shift lever 26 can be moved, but once the lever is at the parking position, it cannot be moved from this position. When the controller 4 supplies a reverse command to the solenoid 25, the rod of the solenoid 25 is pulled in and the locking of the shift lever 26 is released.

In the hybrid vehicle 100, the engine 19 can be started by an external switch (remote switch 41). Therefore, the hybrid vehicle 100 comprises a receiver 21. The receiver 21 receives a signal which is transmitted by the remote switch 41. One of the received signals is a signal which indicates an engine start request. Upon receiving a signal from the remote switch 41 via the receiver 21, the controller 4 activates the motor 12 and starts the engine 19. Here, the controller 4 is programmed so as to start the engine 19 only when several conditions have been met. Below, the signal from the remote switch 41 is referred to a remote start request. A signal requesting engine start which is sent to the controller 4 from the main switch 22 provided at the driver's seat is referred to an in-vehicle start request. The remote start request and the in-vehicle start request have different data formats, and the controller 4 is able to distinguish between the remote start request and the in-vehicle start request. Furthermore, below, the remote start request and the in-vehicle start request are referred to jointly as "start request".

Figure 2:
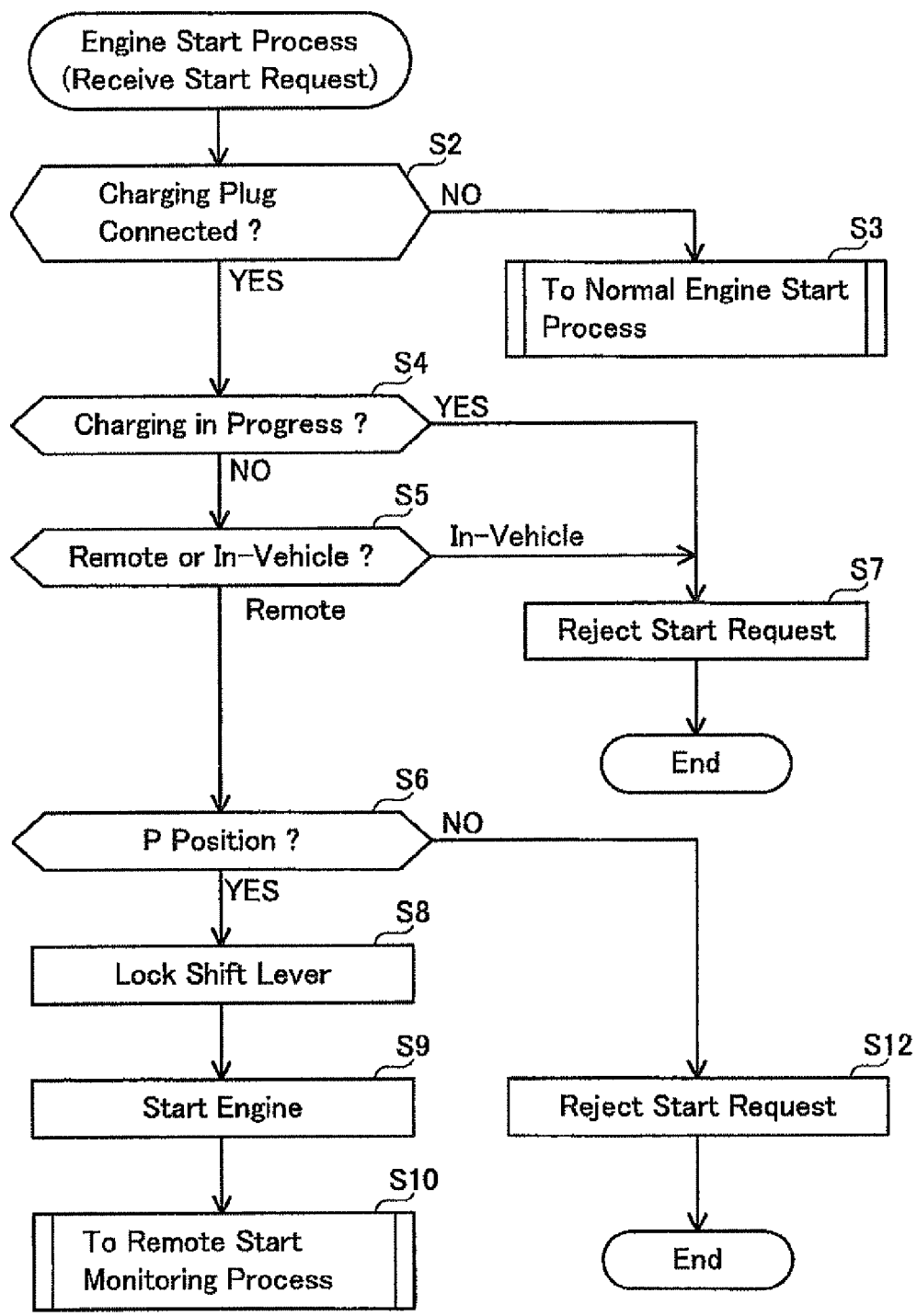
FIG. 2 is a flowchart diagram of engine start process.

The process by the controller 4 when a start request is received (engine start process) will now be described. FIG. 2 shows a flowchart of this process. The process shown in FIG. 2 (and processes shown in FIG. 3 and FIG. 4) are programmed in advance in the controller 4.

Firstly, the controller 4 checks whether or not the charging plug 32 is connected to the socket 33, based on the signal CPR from the plug detection sensor 34 which is provided on the socket 33 (S2). If the charging plug 32 is not connected, then a normal engine start process is carried out (S2: NO, S3). Normal engine start process is executed in a conventional hybrid vehicle, and therefore description thereof is omitted here.

If the charging plug 32 is connected (S2: YES), then the controller 4 checks whether or not charging is in progress (S4); in other words, whether or not the supply of power is being received from the external power source 31. If the charging is in progress (S4: YES), then the controller 4 rejects the start request (S7), whether it be the remote start request or the in-vehicle start request, and terminates the process. If the charging is not in progress (S4: NO), and the start request is the in-vehicle start request (S5: In-Vehicle), then the controller 4 also rejects the start request (S7).

On the other hand, if the charging is not in progress (S4: NO) and if the start request is the remote start request (S5: Remote), then the controller 4 checks the position of the shift lever 26 (S6). As described above, the controller 4 identifies the shift lever position based on the sensor data of the shift position sensor 24. If the position of the shift lever 26 is a position other than "parking", in the process in step S6, then the controller 4 rejects the start request (86: NO, S12). "P" in step S6 in FIG. 2 means "parking". This also applies similarly to other drawings.

On the other hand, if the position of the shift lever 26 is "parking", then the controller 4 locks the shift lever 26 and starts the engine 19 (S6: YES, S8, S9). Here, "locks the shift lever 26" means activating the solenoid 25 in such a manner that the shift lever 26 does not move from the parking position. Furthermore, in order to start up the engine 19, the controller 4 locks the axle 15 and supplies fuel to the engine 19 while driving the motor 12. In this way, the engine 19 is started.

As described above, upon receiving the start request while the charging plug 32 is connected, the controller 4 starts the engine 19 provided that the charging is not being carried out and that the shift lever 26 is at the "parking" position. On the other hand, if the shift lever 26 is in a position other than the "parking", then the controller 4 rejects the remote start request. Furthermore, if the start request is the in-vehicle start request, then the controller 4 always rejects that start request, while the charging plug 32 is connected.

By the process in FIG. 2, even when the charging plug 32 is connected, the hybrid vehicle 100 starts the engine 19 only in the case of the remote start request, provided that safety has been confirmed. For instance, in many cases, the charging plug 32 is connected in the evening and charging is set up on the timer. In cases such as this, if the charging has completed and the charging plug 32 is still connected the next morning, then the user is able to start the engine 19 by using the remote switch 41.

Furthermore, in the process described above, the controller 4 starts the engine 19 and then locks the shift lever 26 (S8). In other words, the controller 4 prohibits movement of the shift lever 26 from the "parking". By this process, it is possible reliably to prevent the vehicle from moving while the engine 19 is running.

Figure 3:
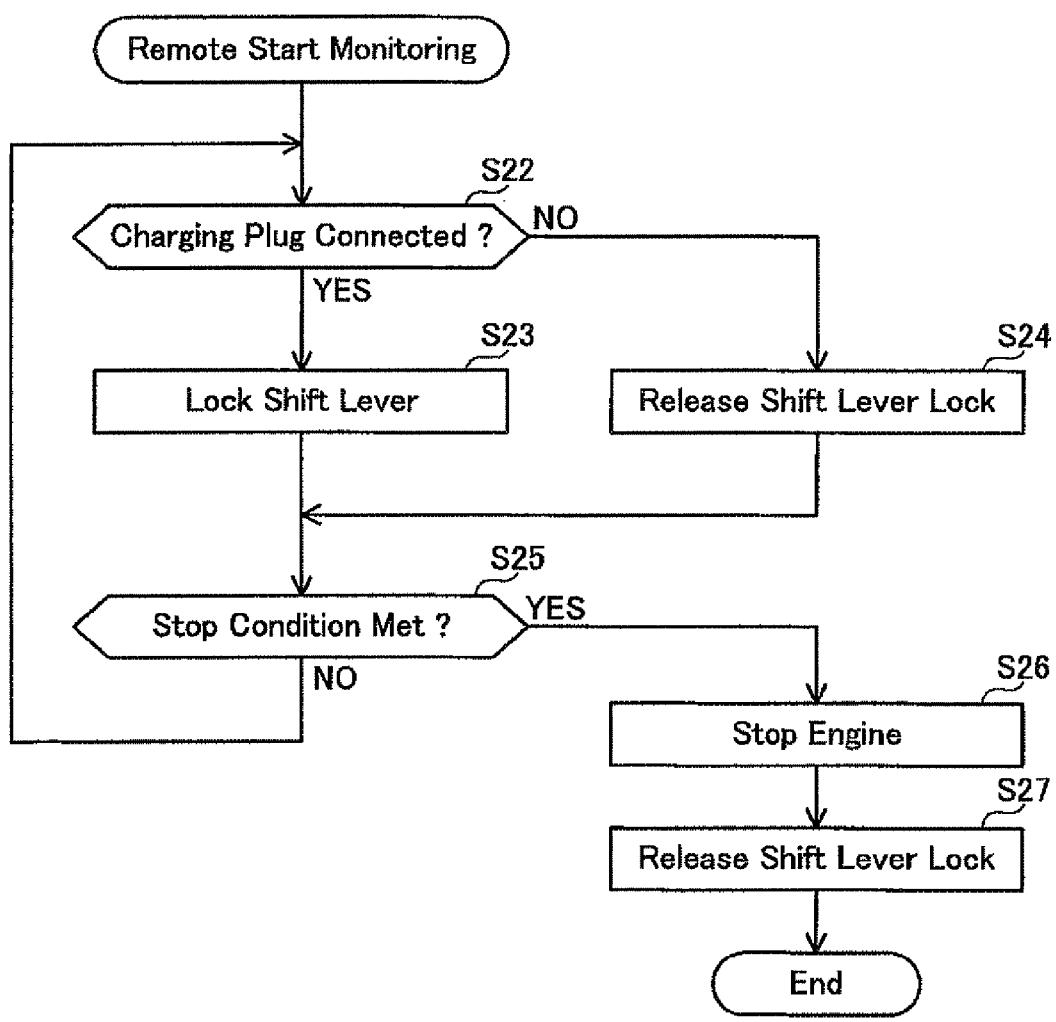
FIG. 3 is a flowchart diagram of a remote start monitoring process.

Next, the process of the controller 4 after starting the engine 19 in response to the remote start request is described. FIG. 3 shows a flowchart of process by the controller 4 in this case (a remote start monitoring process).

When the engine 19 is started by the remote start request, the charging is not carried out (FIG. 2, S4: NO). Therefore, the charging plug 32 may be removed while the engine 19 is running. For this reason, the controller 4 constantly monitors whether or not the charging plug 32 is connected (S22). If the charging plug 32 is not connected, then the controller 4 releases the locking of the shift lever 26 (S22: NO, S24). If the charging plug 32 is connected, then the controller 4 locks the shift lever 26 (S22: YES, S23). The process in step S23 is a countermeasure for a case where the charging plug 32 is removed temporarily and then inserted again.

The controller 4 repeats the remote start monitoring process until a stop condition for the engine 19 is met (S25: NO). The stop condition is typically the conditions described below.
(1) A predetermined time has elapsed since the engine started.
(2) The driver's door is open.
(3) The shift lever is moved.
(4) The brake pedal is pressed.
(5) An engine stop request is received. (The engine stop request is sent from a remote switch 41 or from another switch provided at the driver's seat.)

When any one of the stop conditions described above is met, the controller 4 stops the engine 19, and the locking of the shift lever 26 is released (S25: YES, 526, S27). Thereupon, the controller 4 stops the whole system of the vehicle, with the exception of some devices which operate continuously (security devices, and the like).

In the process described above, when removal of the charging plug 32 is detected, the controller 4 releases the locking of the shift lever 26. For example, if the user who has started the engine with the remote switch 41 wishes directly to remove the charging plug 32 and drive the vehicle, then the user is able to drive the vehicle off quickly, without needing to perform an operation for releasing the lock.

Figure 4:
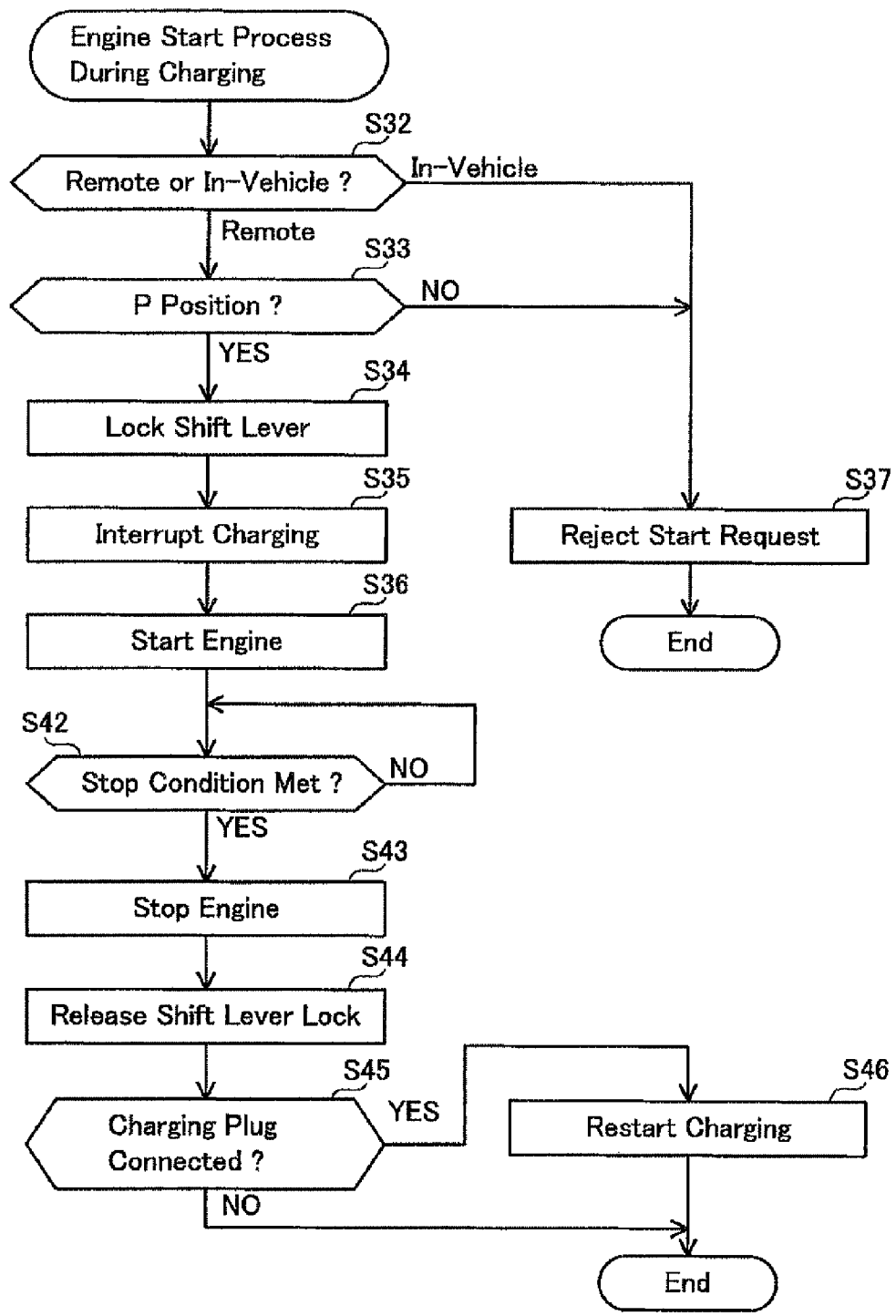
FIG. 4 is a flowchart diagram of a process when a start request is received during charging.

Next, a modification example of the engine start process shown in FIG. 2 is described. FIG. 4 shows a flowchart of a process according to the modification example. The process in FIG. 4 is a process which is carried out subsequently when charging is in progress in the step S4 in FIG. 2 (S4: YES).

If the charging plug 32 is connected and charging is in progress, then the controller 4 checks whether the start request is "remote" or "in-vehicle". If the start request is "in-vehicle", then the controller 4 rejects the start request similar to the case in FIG. 2 (S37). If the start request is "remote", then the controller 4 checks that the position of the shift lever 26 is the "parking" (S33). If the position of the shift lever 26 is a position other than the "parking", the controller 4 rejects the start request (S33: NO, S37).

If the position of the shift lever 26 is "parking", then the controller 4 locks the shift lever 26 (S34), interrupts charging (S35) and starts the engine 19 (S36).

After starting the engine 19, the controller 4 waits until a stop condition is met (S42: NO). Here, the stop conditions are as described in relation to FIG. 2. When a stop condition is met (S42: YES), the controller 4 stops the engine 19 (S43) and releases the locking of the shift lever 26 (S44). Thereupon, the controller 4 confirms that the charging plug 32 is connected (S45: YES), and restarts the charging (S46). If it has not been possible to confirm that the charging plug 32 is connected in step S45 (S45: NO), then the controller 4 terminates the process directly.

By the process in FIG. 4, the user is able to start the engine by using the remote switch 41, even while the vehicle is being charged. In the process in FIG. 4, the start request from the main switch 22 at the driver's seat is rejected (S32; In-Vehicle, S37). Furthermore, if the position of the shift lever 26 is other than the "parking", then the start request is rejected (S33: NO, S37). Therefore, the hybrid vehicle 100 can start the engine safely in response to the remote start request from the remote switch 41.

As described above, by adopting the technique described in the embodiment, it is possible for the user to start the engine 19 safely with the remote switch 41, even if the charging plug 32 is connected.

The following points should be noted in relation to the technique in the embodiments. The processes in FIG. 2, FIG. 3 and FIG. 4 are examples and the technique disclosed by the present specification is not restricted to the processes in the flowcharts illustrated in the diagrams. For example, in the process in step S6 in FIG. 2, if the position of the shift lever is other than the "parking", then the vehicle controller may move the shift lever to the "parking" position by an actuator. In this case, if the start request is the remote request, then the engine can be started at all times. The same applies to step S33 in FIG. 4.

Furthermore, the process in FIG. 2 to FIG. 4 may include exceptional process(es). For example, in the engine start process during the charging shown in FIG. 4, the controller 4 may be programmed in such a manner that, in a case of an emergency charging or if the SOC of the main battery 5 is lower than a predetermined SOC threshold value, the controller 4 may prioritize the charging and reject the remote start request.

Furthermore, if the in-vehicle start request is rejected, then the controller 4 desirably shows a message indicating the rejection of the start request, on a monitor 23 which is provided at the driver's seat (see FIG. 1).

The shift lever 26 is not limited to a "slot type" lever. The technique disclosed in the present specification can also be applied to a hybrid vehicle having a "shift by wire" type of shift mechanism or a joystick type shift mechanism. Consequently, the mechanism which prohibits the movement of the shift lever is not limited to a solenoid 25, and may also be achieved by an actuator of another type.

The configuration of the hybrid vehicle is not limited to the configuration in FIG. 1. For example, the technique disclosed by the present specification may be suitable for a hybrid vehicle having an engine and a plurality of motors.

Representative and non-limiting concrete examples of the present invention have been described in detail with reference to the drawings. This detailed description is merely intended to indicate details for implementing desirable examples of the present invention, to a person skilled in the art, and is not intended to limit the scope of the present invention. Furthermore, additional characteristics and inventions which have been disclosed can be used separately from, or jointly with, other characteristics and inventions, in order to provide a further improved plug-in hybrid vehicle.

Moreover, the combinations of characteristics and steps disclosed in the detailed description given above are not essential for implementing the present invention in the broadest sense, and are stated only in order to describe representative concrete examples of the present invention, in particular. Furthermore, the various characteristics of the representative concrete examples described above and the various characteristics described in the independent and subordinate claims do not have to be combined as stated in the concrete examples given here or in the cited order, in order to provide additional and useful embodiments of the present invention.

All of the characteristics stated in the present specification and/or claims are intended to be disclosed individually, or independently from each other, as limitations of the specific matters disclosed and claimed initially upon filing, separately from the characteristic composition described in the embodiments and/or claims. Furthermore, all of the numerical ranges and descriptions relating to groups and groupings are intended to disclose intermediate compositions, as limitations of the specific matters disclosed and claimed initially upon filing.

Concrete examples of the present invention were described in detail above, but these are no more than illustrative examples, which do not restrict the scope of the claims. The technology described in the claims includes various changes and modifications to the concrete examples given above. The technical elements described in the specification or illustrated in the drawings display technical utility either independently or in combination, and are not limited to the combinations stated in the claims at the time of application. Furthermore, the technologies described in the specification or illustrated in the drawings can achieve a plurality of objects simultaneously, and have technical utility in achieving any one of this plurality of objects.

The invention claimed is:

1. A hybrid vehicle chargeable by an external electric power source,
    the hybrid vehicle having a controller which is configured to perform, while the hybrid vehicle is connected with a plug that supplies electric power thereto from the external power source:
    determining whether charging is being performed when a remote start request for starting an engine is received from a remote switch outside the hybrid vehicle;
    starting the engine when a result of the determining is that the charging is not being performed and a shift lever is at a parking position;
    rejecting the remote start request when the shift lever is at a position other than the parking position when the remote start request is received; and
    rejecting an in-vehicle start request for starting the engine from a switch provided in the hybrid vehicle.

2. The hybrid vehicle of claim 1, wherein the controller prohibits moving the shift lever from the parking position when the controller starts the engine in response to the remote start request.

3. The hybrid vehicle of claim 2, wherein the controller cancels the prohibition of the shift lever movement when the controller detects disconnection of the plug after the controller starts the engine in response to the remote start request.

4. The hybrid vehicle of claim 1, wherein:
    when the controller receives the remote start request while the charging is performed by the external electric power source, the controller stops the charging and starts the engine if the shift lever is at the parking position and rejects the remote start request if the shift lever is at a position other than the parking position; and
    when the controller receives a request for stopping the engine from the remote switch or a predetermined time limit has expired, the controller stops the engine and restarts the charging.

5. The hybrid vehicle of claim 1, wherein the controller is further configured to perform rejecting the remote start request when the result of the determining is that the charging is being performed.

6. The hybrid vehicle of claim 1, wherein the controller is further configured to: (1) perform interrupting charging and (2) start the engine, when the result of the determining is that the charging is being performed and the shift lever is at the parking position.

* * * * *